United States Patent [19]
Yasuda

[11] Patent Number: 5,820,898
[45] Date of Patent: Oct. 13, 1998

[54] METAL MOLD APPARATUS FOR MOLDING AN OPTICAL DISK

[75] Inventor: Katsuyuki Yasuda, Funabashi, Japan

[73] Assignee: Seikoh Giken Co., Ltd., Chiba-Ken, Japan

[21] Appl. No.: 758,937

[22] Filed: Dec. 3, 1996

[30] Foreign Application Priority Data

Mar. 22, 1996 [JP] Japan .................................. 8-091789

[51] Int. Cl.⁶ .................................................. B29C 45/40
[52] U.S. Cl. .......................... 425/542; 264/106; 264/107; 425/810
[58] Field of Search .................... 425/810, 542; 264/106, 107

[56] References Cited

U.S. PATENT DOCUMENTS

| | | | |
|---|---|---|---|
| 4,447,381 | 5/1984 | Matey | 425/810 |
| 5,593,710 | 1/1997 | Asai | 425/810 |

FOREIGN PATENT DOCUMENTS

| | | |
|---|---|---|
| 0 640 548 A | 3/1995 | European Pat. Off. . |
| 62 067 744 | 3/1987 | Japan . |
| 02 022 012 | 1/1990 | Japan . |
| 08 057 908 | 3/1996 | Japan . |
| 08 267 514 | 10/1996 | Japan . |

*Primary Examiner*—Tim Heitbrink
*Attorney, Agent, or Firm*—Spencer & Frank

[57] ABSTRACT

An optical disk metal mold apparatus includes a fixed cavity plate; a movable cavity plate facing the fixed cavity plate; a disk-shaped plate disposed on at least one of the fixed and movable cavity plates such that it is movable with respect thereto; a stamper plate concentrically supported on the at least one of the fixed and movable cavity plates by the disk-shaped plate such that it is movable with respect to the disk-shaped plate and the at least one of the fixed and movable cavity plates; wherein the stamper plate and the disk-shaped plate are each made of a material and further configured such that a difference between respective deformations of the disk-shaped plate and the stamper plate caused by expansion and contraction thereof due to temperature changes during a molding cycle is smaller than a difference between respective deformations of the stamper plate and the at least one of the fixed and movable cavity plates caused by expansion and contraction thereof due to temperature changes during a molding cycle if the stamper plate were to be in direct contact with the at least one of the fixed and movable cavity plates.

8 Claims, 6 Drawing Sheets

METAL MOLD APPARATUS FOR MOLDING AN OPTICAL DISK

BACKGROUND OF THE INVENTION

1. Field of the Invention

The present invention relates to an optical disk metal mold apparatus for molding a plastic optical disk substrate by using a stamper plate which is retained by vacuum suction or the like and, more particularly, to an optical disk molding metal mold apparatus which is equipped with an improved stamper plate supporting structure.

2. Description of the Related Art

Figure 10:
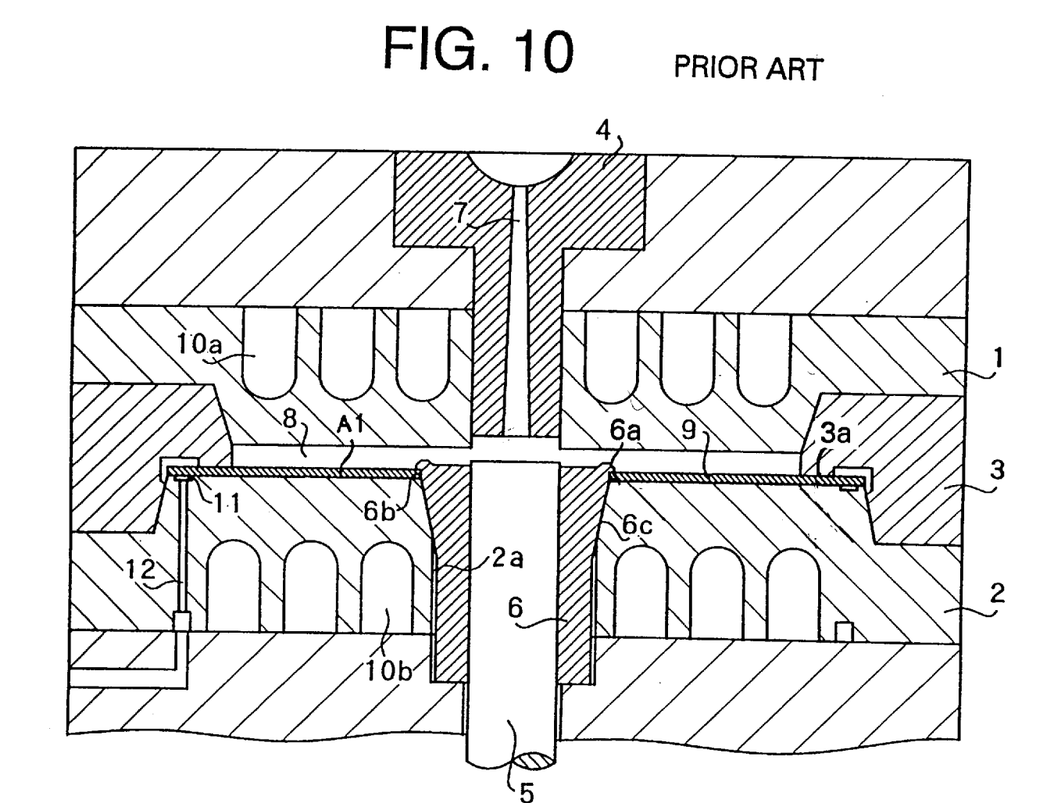
FIG. 10 is a sectional view showing a conventional optical disk molding metal mold apparatus wherein the stamper plate has been attached and retained onto the movable cavity plate by vacuum-suction.

A predicted problem with a vacuum-suction type stamper plate will be described with reference to FIG. 10 which shows an essential section of a metal mold for molding a plastic optical disk substrate, which metal mold is designed to retain a conventional stamper plate in a movable cavity plate by vacuum suction. In the optical disk molding metal mold apparatus shown in FIG. 10, a disk-shaped cavity space 8 is formed by a fixed cavity plate 1 and a movable plate 2 which are disposed opposite one another, and an outer periphery stamper holder 3.

A sprue bush 4 having an injection hole 7 is installed on the axial center of the fixed cavity plate 1. Charged into the disk-shaped cavity space 8 through the injection hole 7 is molten resin supplied through an injection nozzle which is not shown. A central hole 2a is formed at the central part of the opposed movable cavity plate 2.

A stamper holder 6 is inserted and fitted in the hole 2a. The stamper plate holder 6 is provided with a part 6b, which is precisely fitted in the central hole of a stamper plate 9, a flange 6a for holding the inner periphery of the stamper plate, and a fitting surface 6c which is positioned at the axial center of the movable cavity plate 2. A concentric groove 11 is provided along the outer periphery of the surface of the movable cavity plate 2, which surface comes in contact with the stamper plate 9.

The concentric groove 11 is communicated with a vacuum suction circuit, which is not shown, via a suction hole 12; the stamper plate 9 is retained by vacuumizing the space between a polished surface A1 of the movable cavity plate 2, which surface comes in contact with the stamper plate 9. A gate cut sleeve 5 for punching the central part of the optical disk substrate, which is not shown, is provided at the axial center of the movable cavity plate 2 in such a manner that it can move back and forth in the axial direction at the center of the stamper plate holder 6. Provided inside the fixed cavity plate 1 and the movable cavity plate 2 are temperature control channels 10a, 10b for cooling and solidifying the molten resin which has been charged in the cavity space 8.

To mold an optical disk substrate by using the aforesaid conventional optical disk molding metal mold apparatus, the molten resin is first charged into the cavity space 8 at a predetermined temperature and pressure through the injection hole 7 provided on the sprue bush 4; then, the gate cut sleeve 5 moves toward the sprue bush 4 to punch the central part of the optical disk substrate which is not shown. By a pressurizing process, the information signals and the recesses and projections of a track groove for recording signals on the stamper plate 9, which has been brought in close contact with the polished plate of the movable cavity plate 2 by vacuum suction, are transferred to an article to be molded.

After that, the molten resin is cooled and solidified by the temperature control water, not shown, which runs through the temperature controlling channels 10a, 10b provided on the fixed cavity plate 1 and the movable cavity plate 2, respectively; thus, the optical disk substrate is molded.

In the optical disk substrate molding process, when the molten resin has been charged in the cavity space 8, the stamper plate 9 radially expands from the central part thereof because of the heat received from the molten resin; in the resin cooling and solidifying process, it will be deprived of the heat and shrink back to the original state. Thus, the stamper plate 9 repeats expansion and shrinkage due to the transfer of the heat as mentioned above. The extremely small movement of the stamper plate 9 in relation to the cavity plate 2 takes place at the contact surface A1, with the stamper plate 9 being in close contact with the top surface of the movable cavity plate 2 by vacuum suction. Therefore, as the molding process is repeated, the aforesaid slight movement is accordingly repeated at the contact surface A1, causing the stamper plate 9 to wear. When such wear occurs, the stamper plate 9 produces wear powder on the contact surface A1; the wear powder goes into the cavity and it is gradually moved and built up toward the stamper plate 9 because of the pressure applied by the molten resin. This eventually damages the information signals on the stamper plate 9 or the recesses and projections of the track grooves for signal recording, presenting a problem in that the service life of the stamper plate 9 is significantly shortened.

Furthermore, there are some cases where it is necessary to change the type of stamper plate for molding in the optical disk molding apparatus. In such a case, the diameter of the central hole in the stamper plate or the plate thickness changes; accordingly, it is necessary to change the dimension of a part 6b which precisely fits in the central hole of the stamper plate of the inner periphery stamper holder 6 which is a component in the metal mold, the dimension of the movable cavity plate 2 connected to the part 6b, and the dimension of a tapered fitting diameter 6c of the inner periphery stamper holder 6. For a different plate thickness, it is necessary to change the distance between a surface 6a of the inner periphery stamper holder 6 for locking the stamper plate 9 and the contact surface A1 of the movable cavity plate 2 which comes in contact with the stamper plate 9. In addition, it is also necessary to change the distance between a surface 3a provided on the outer periphery stamper 3, which surface holds the stamper plate 9, and the contact surface A1 which comes in contact with the stamper plate 9. Thus, cumbersome changes of the shapes and dimensions of major components have been required for different types of stamper plates.

SUMMARY OF THE INVENTION

Accordingly, it is an object of the present invention to provide an optical disk molding metal mold apparatus which is capable of preventing the deterioration of the transcribing surface of a stamper plate, which deterioration is caused by wear dust produced by the rubbing motion attributable to a difference in thermal expansion between a cavity plate and the stamper plate which is brought in contact with the cavity plate.

It is another object of the present invention to provide an optical disk molding metal mold apparatus which is capable of securely retaining different types of stamper plates without the need of changing major components in the aforesaid type of optical disk molding metal mold apparatus.

To these ends, according to the present invention, there is provided an optical disk molding metal mold apparatus which has a stamper plate brought in close contact with either one or both of the faceplate of a fixed cavity plate and the faceplate of a movable cavity plate which face one another to form a cavity; wherein the stamper plate is concentrically disposed on the faceplate or faceplates via a disk-shaped plate; and the materials of the components are selected and the components are configured so that the difference between the respective deformations of the disk-shaped plate and of the stamper plate caused by expansion and contraction thereof due to temperature changes during a molding cycle of the metal mold which is cooled from the cavity plate side is smaller than the difference observed between the respective deformations of the stamper plate and the cavity plate caused by expansion and contraction thereof due to temperature changes when the stamper plate is directly brought in close contact with the cavity plate.

In the optical disk metal mold apparatus, the materials of the components may be selected and the components may be configured so that, if the linear expansion coefficients of the stamper plate, the disk-shaped plate, and the movable cavity plate denoted as $\beta_1$, $\beta_2$, and $\beta_3$, respectively, and the temperature change of the stamper plate is denoted as $\Delta t_1$, the temperature change of the disk-shaped plate is denoted as $\Delta t_2$, and the temperature change of the movable cavity plate on the disk-shaped plate side is denoted as $\Delta t_3$ in the molding cycle of the metal mold, and if $\Delta t_1 > \Delta t_2 > \Delta t_3$, then the following relationship is established: $\beta_1 \times \Delta t_1 > \beta_2 \times \Delta t_2 > \beta_3 \times \Delta t_3$.

Preferably, the linear expansion coefficient of the disk-shaped plate may be not less than the linear expansion coefficient of the stamper plate and not more than $6 \times 10^{-6}$ per degree centigrade.

The stamper plate and the disk-shaped plate are concentrically supported by the cavity plate via an adapter having an outer peripheral section which fits in at least the central hole of the stamper plate.

The adapter may be designed to be a stepped cylinder providing different outer peripheral sections which fit in the central holes of the stamper plate and the disk-shaped plate, respectively.

The adapter has an outer peripheral section which fits at least in the central hole of the stamper plate and it may be designed so as to hold the circumferential edge of the central hole of the stamper plate by a jaw having a diameter which is larger than the central hole diameter of the stamper plate.

The adapter may be provided with a passage which communicates with a suction passage provided on the cavity plate so as to attract the stamper plate by suction.

Near the outer periphery of the disk-shaped plate, a passage may be provided for attracting by suction the inside of the outer periphery of the stamper plate, the passage being communicating with the suction passage provided on the cavity plate.

DETAILED DESCRIPTION OF THE PREFERRED EMBODIMENTS

Figure 1:
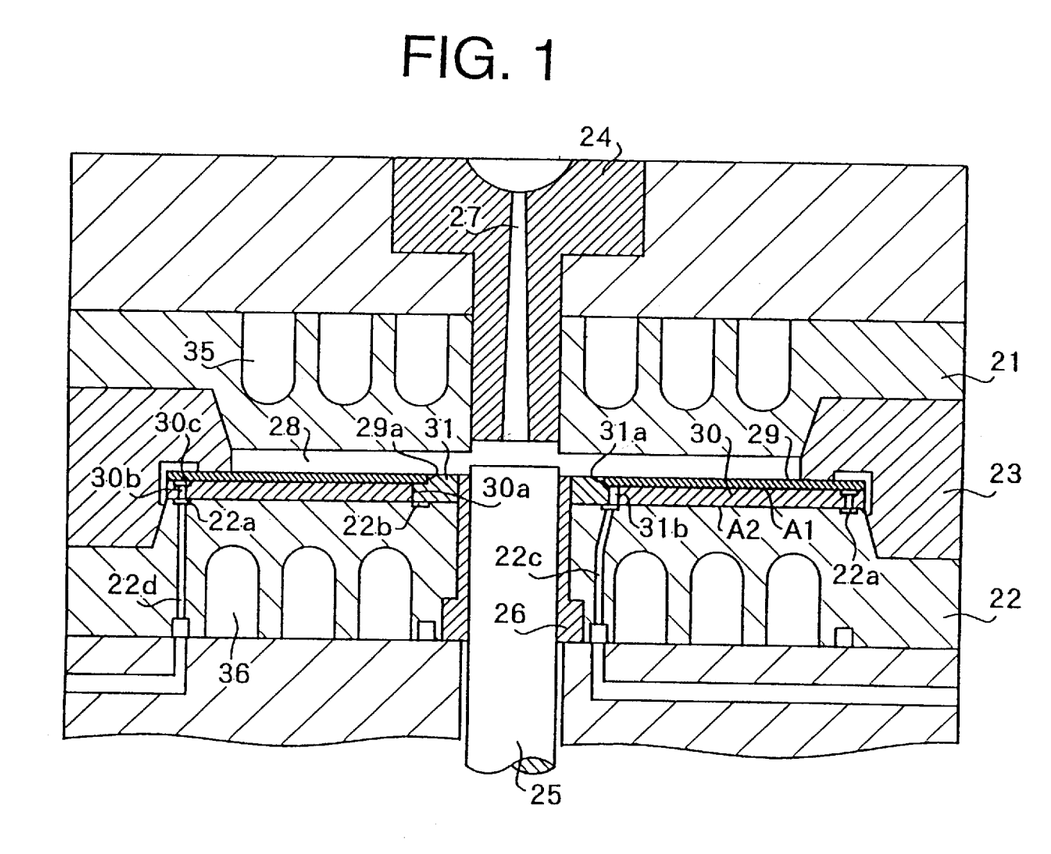
FIG. 1 is a sectional view showing an embodiment of an optical disk molding metal mold apparatus in accordance with the present invention.
Figure 2:
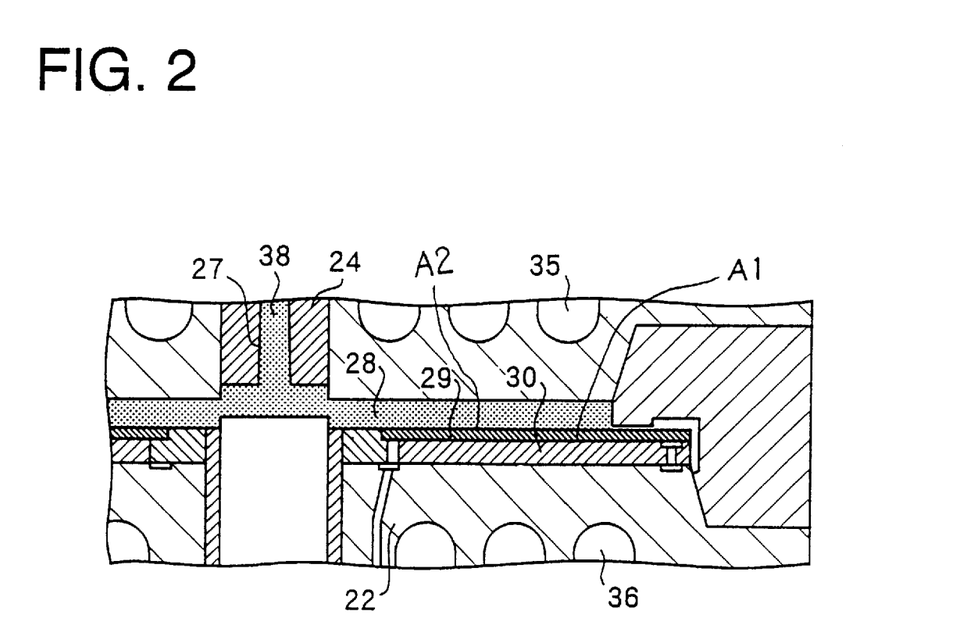
FIG. 2 is a sectional, enlarged view of a cavity section of the metal mold shown in FIG. 1 for injection-molding an optical disk substrate.

An optical disk molding metal mold apparatus in accordance with the present invention will be described in further detail with reference to the accompanying drawings. FIG. 1 is a sectional view showing an embodiment of the optical disk molding metal mold apparatus in accordance with the present invention, and FIG. 2 is a sectional view showing an enlarged view of a cavity section of the metal mold for injection-molding an optical disk substrate shown in FIG. 1.

The optical disk molding metal mold apparatus of the embodiment shown in FIG. 1 includes a fixed cavity plate 21 and a movable cavity plate 22, which face one another, and a disk-shaped plate 30 disposed above the top surface of the movable cavity plate 22. The top surface of a stamper plate 29 is held by an outer periphery stamper holder 23. These components form a disk-shaped cavity space 28 for molding an optical disk substrate which is not shown. Further, temperature control channels 35 and 36 are provided inside the fixed cavity plate 21 and the movable cavity plate 22, respectively.

A sprue bushing 24 is provided at the axial center of the fixed cavity plate 21. Molten resin, which is supplied through an injection nozzle, not shown, is injected and charged into the cavity space 28 via an injection hole 27 which is provided at the center of the sprue bushing 24. A gate cut sleeve 25 for drilling the central part of the optical disk substrate, not shown, is provided at the axial center of the movable cavity plate 22 opposing to the fixed cavity plate 21 in such a manner that it may move back and forth through a cylindrical bushing 26. The bushing 26 positions the disk-shaped plate 30 in cooperation with an adapter 31.

In this embodiment, it will be assumed that the stamper plate 29 is made of pure nickel steel and the disk-shaped plate 30 is also made of the same pure nickel steel so that they exhibit the same linear expansion coefficient.

Figure 4:
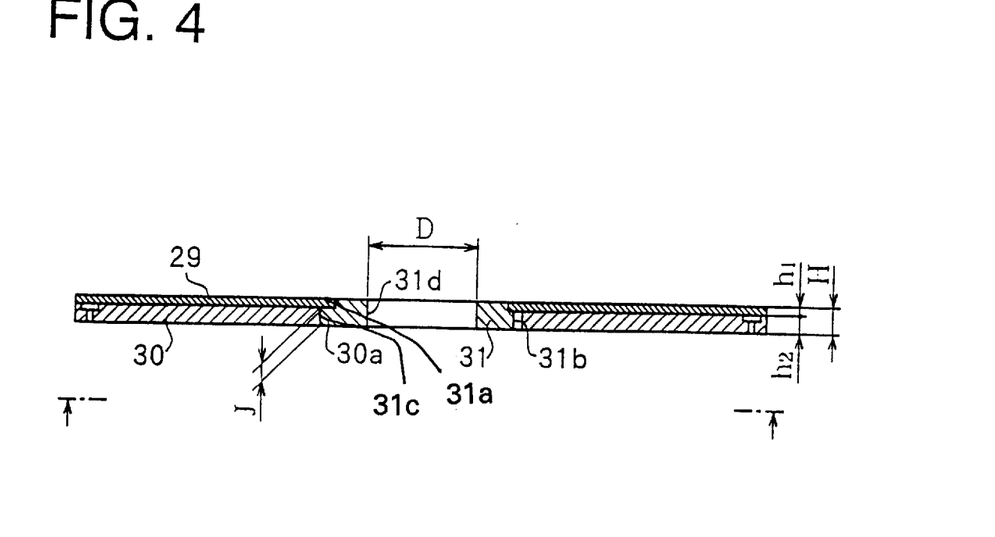
FIG. 4 is a sectional view showing an embodiment of a first combination of a disk-shaped plate, an adapter, and a stamper plate used in the optical disk molding metal mold apparatus in accordance with the present invention.
Figure 5:
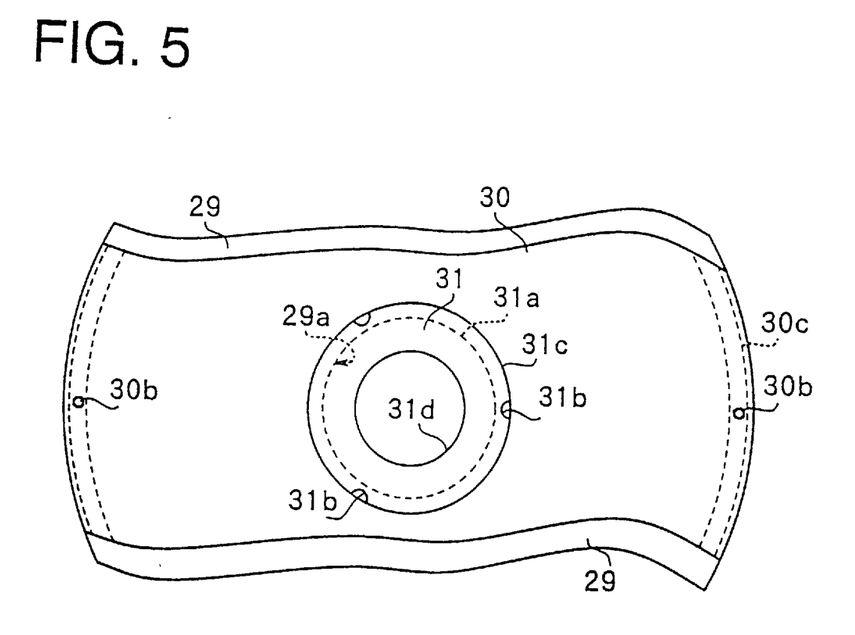
FIG. 5 is a bottom view of the embodiment of FIG. 9.

FIG. 4 and FIG. 5 show the stamper plate 29, the disk-shaped plate 30, and the adapter 31. FIG. 4 is a sectional view showing a combination of the aforesaid components; and FIG. 5 is a bottom view of the combination.

A central hole 29a of the stamper plate 29 is 3 mm smaller than a central hole 30a of the disk-shaped plate 30. A central hole 31d of the adapter to be fitted to the bushing 26 is provided at the center of the stepped adapter 31 made of stainless steel. The adapter 31 is provided with a stamper plate fitting section 31a to be fitted to the central hole 29a of the stamper 29 and a disk-shaped plate fitting section 31c which fits in the central hole of the disk-shaped plate 30.

The outer periphery of the disk-shaped plate fitting section 31c of the adapter 31 is provided with three notch grooves 31b. The stepped adapter 31 is fitted on the outer periphery of the movable bushing 26, the central hole 29a of the stamper plate is fitted onto the part 31a provided on the stepped adapter 31, and the stamper plate 29 is mounted on the top surface of the disk-shaped plate 30, thereby accurately positioning the stamper plate 29 at the axial center of the movable cavity plate 22.

The inner circumference of the stamper plate 29 is attached by suction onto the outer peripheral surface of the part which is held against the central hole 30a of the disk-shaped plate 30 of the stepped adapter 31 via the three notch grooves 31b. Further, a concentric U-shaped groove 30c is formed on the outer circumference of a surface which is in contact with the stamper plate 29 of the disk-shaped plate 30 and four through suction holes 30b are provided on the inner circumferential surface of the U-shaped groove. Concentric U-shaped grooves 22a and 22b are formed on the top surface of the movable cavity plate 22; the U-shaped groove 22a is communicated with the hole 30b while the U-shaped groove 22b is communicated with the notch 31b of the adapter 31. The concentric U-shaped grooves 22b and 22a on the top surface of the movable cavity plate 22 communicate with one another via a vacuum suction circuit, not shown, via suction passages 22c and 22d which run through the movable cavity plate 22. This arrangement makes it possible to vacuumize the inner and outer peripheral sections of the surface A1 of the disk-shaped plate 30 which is held against the movable cavity plate 22 and therefore enables the disk-shaped plate 30 and the stepped adapter 31 to be mounted on the top surface of the movable cavity plate 22 together with the stamper plate 29. Thus, the stamper plate can be attached and detached simply by turning the vacuum suction circuit ON and OFF, respectively.

Figure 3:
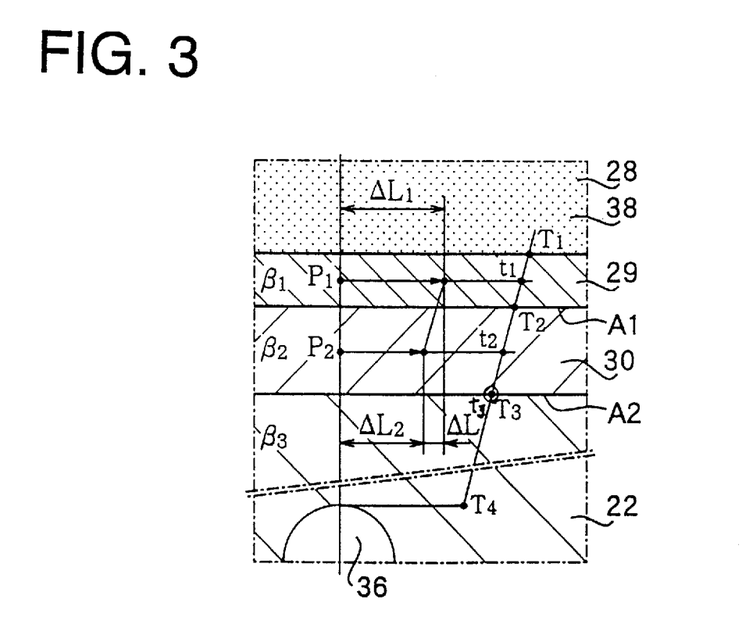
FIG. 3 is a schematic showing a further enlarged view of an essential section of the metal mold of the optical disk molding metal mold apparatus shown in FIG. 2 where a problem of a slight relative movement in a heat cycle is illustrated diagrammatically.

Referring further to FIG. 2 and FIG. 3, the operation of the apparatus according to the present invention in the process for molding the optical disk substrate will be described. As shown in FIG. 2, hot molten resin 38 is charged into the cavity space 28 through the injection hole 27 provided in the sprue bush 24 at a predetermined temperature, e.g. approximately 340 degrees centigrade, and under a predetermined pressure.

The heat of the molten resin 38 reaches the temperature control channel 36 provided in the movable cavity plate 22 via the stamper plate 29 and the disk-shaped plate 30 and it sets the temperature control water (not shown) into motion. The molten resin 38, which has been charged in the cavity space 28, is then gradually cooled from the cavity plate side to solidify and is taken out when it has been cooled down, for example, to about 70 degrees centigrade.

Referring to FIG. 3, the behaviors of the stamper plate 29 and the disk-shaped plate 30 when they expand and contract during the molding cycle will now be described in detail.

In the figure, $T_1$, $T_2$, $T_3$, and $T_4$ denote the temperatures on an identical arbitrary radius; $T_1$ indicates the temperature, e.g. 340 degrees centigrade, of the molten resin 38, $T_2$ indicates the temperature of the contacting surface A1 between the stamper plate 29 and the disk-shaped plate 30, $T_3$ indicates the temperature of a contacting surface A2 between the disk-shaped plate 30 and the movable cavity plate 22, and $T_4$ indicates the temperature, e.g. 70 degrees centigrade or below, of the temperature control water, which runs through the temperature control channel 36 and which is not shown, or the temperature in the vicinity of the temperature control channel 36.

Normally, the temperature $T_1$ of the molten resin 38 is higher than the temperature of the temperature control water; therefore, the aforesaid temperatures present a temperature gradient which is expressed as $T_1 > T_2 > T_3 > T_4$ in the heat transfer process because of the rule of the heat conduction. It is more reasonable to consider that the temperature involved in the slight movement, namely, the expansion, of the contacting surface A1 between the stamper plate 29 and the disk-shaped plate 30 is the temperature at the central part of each plate thickness rather than the temperature $T_2$ on the contacting surface A1.

If the temperature of the central part of the stamper plate 29 is denoted by $t_1$, the temperature of the central part of the disk-shaped plate 30 is denoted by $t_2$, and the temperature in the vicinity of the polished surface of the movable cavity plate 22 is denoted by $t_3$, then a relationship expressed by $t_1 > t_2 > t_3$ also applies.

In a repeated molding process, if the maximum temperatures of the aforesaid $t_1$, $t_2$, and $t_3$ when the stamper plate 29 is held on the disk-shaped plate 30 by suction are respectively denoted by $t_{1max}$, $t_{2max}$, and $t_{3max}$, and the minimum temperatures are respectively denoted by $t_{1min}$, $t_{2min}$, and $t_{3min}$, then temperature differences $\Delta t_1$, $\Delta t_2$, and $\Delta t_3$ are defined as shown below:

$\Delta t_1 = t_{1max} - t_{1min}$ $\Delta t_2 = t_{2max} - t_{2min}$ $\Delta t_3 = t_{3max} - t_{3min}$ In this case also, the relationship expressed by $\Delta t_1 > \Delta t_2 > \Delta t_3$ is considered to be established.

Thus, when the molten resin 38 shown in the figure is charged in the cavity space 28, a point $P_1$ on the stamper plate 29 and a point $P_2$ on the disk-shaped plate 30, which correspond to the locations undergoing temperature changes $\Delta t_1$ and $\Delta t_2$, respectively at the central parts of the plate thicknesses on the radius, expand by $\Delta L_1 = \beta_1 \times \Delta t_1$ and $\Delta L_2 = \beta_2 \times \Delta t_2$, respectively, which correspond to a linear expansion coefficient $\beta_1$ of the stamper plate 29 and a linear expansion coefficient $\beta_2$ of the disk-shaped plate 30, respectively. After that, the molten resin 38 is deprived of heat by the temperature control water and it completes its solidification, causing the stamper plate and the disk-shaped plate to restore the original states thereof.

As a result, a slight relative movement $\Delta L$ of the stamper plate 29 with respect to the disk-shaped plate 30 is expressed by $\Delta L = \Delta L_1 - \Delta L_2 = \beta_1 \times \Delta t_1 - \beta_2 \times \Delta t_2$. Hence, in order to minimize the slight movement $\Delta L$, the linear expansion coefficient $\beta_2$ of the disk-shaped plate 30 must be at least equal to or larger than the linear expansion coefficient $\beta_1$ of the stamper plate 29 according to the relationship of $\Delta t_1 > \Delta t_2$.

Therefore, in this embodiment, the pure nickel steel which is the same material used for the stamper plate 29 is employed for the disk-shaped plate 30 as previously mentioned so as to provide the same linear expansion coefficient. The linear expansion coefficients of nickel are $13.4 \times 10^{-6}$, $15.3 \times 10^{-6}$, and $16.8 \times 10^{-6}$ at 293° K., 500° K., and 800° K., respectively.

Further, the thickness of the disk-shaped plate 30 is set based on the temperature $T_1$ of the molten resin 38, the temperature $T_4$ of the temperature control water, and the heat conductivity of the pure nickel steel so that the difference between the average temperature $\Delta t_1$ and $\Delta t_2$ of the central parts of the stamper plate 29 and the disk-shaped plate 30, respectively, is minimized.

If the pure nickel steel is employed for the stamper plate and a different material is employed for the disk-shaped plate, then the linear expansion coefficient $\beta_2$ of the disk-shaped plate 30 should preferably be not less than the linear expansion coefficient $\beta_1$ of the stamper plate but not more than $6 \times 10^{-6}$ per degree centigrade. This enables the stamper plate 29 to have an extremely small relative movement $\Delta L$ with respect to the disk-shaped plate 30, thus permitting reduced wear on the stamper plate 29. The top and bottom surfaces of the disk-shaped plate 30 are polished and smoothed to have specular surfaces so as to minimize the contact heat resistance on the surfaces A1 and A2, shown in FIG. 2 and FIG. 3, which respectively contact with the stamper plate 29 and the movable cavity plate 22.

In this embodiment, the movable and fixed cavity plates employ stainless steel. The linear expansion coefficient $\beta_3$ of stainless steel is $14.7 \times 10^{-6}$, $17.5 \times 10^{-6}$, and $20.2 \times 10^{-6}$ at 293° K., 500° K., and 800° K., respectively, indicating that the linear expansion coefficient is slightly larger than the heat conductivity of pure nickel steel. If the stamper plate and the disk-shaped plate are made of pure nickel steel, then the linear expansion coefficients thereof are smaller than the linear expansion coefficient of the cavity plates; however, since the temperature change is $\Delta t_3 < \Delta t_2$, a relationship expressed by $\beta_1 \times \Delta t_1 > \beta_2 \times \Delta t_2 > \beta_3 \times \Delta t_3$ is established in this embodiment, suggesting that the slight relative movement is reduced.

There are cases where stamper plates having different central hole diameters or different thicknesses must be mounted on the optical disk molding metal mold apparatus. In such cases, in the conventional apparatus which has been described with reference to FIG. 10, at least the outer peripheral stamper plate holder 3 and the stamper plate holder 6 for holding the stamper plate at the inner periphery must be replaced.

In the example shown in FIG. 4 and FIG. 5, a diameter D of 31a, corresponding to the diameter of the central hole of the stamper plate, may be changed and a thickness dimension $h_2$ of the disk-shaped plate 30 and a length J of a part held against the central hole 30a formed at the center of the disk-shaped plate 30 of the stepped cylindrical ring 31 may be changed to accommodate a different thickness dimension $h_1$ of the stamper plate 29 by keeping constant a thickness H which is a sum of $h_1$ and $h_2$.

Figure 6:
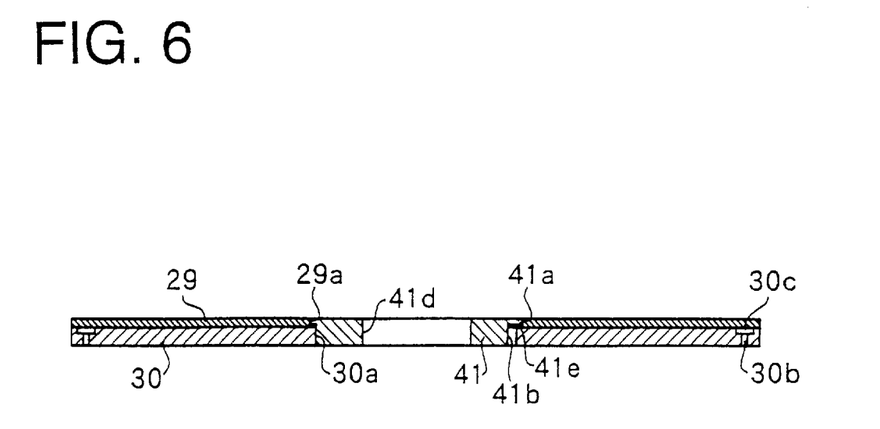
FIG. 6 is a sectional view showing an embodiment of a second combination of the disk-shaped plate, the adapter, and the stamper plate used in the optical disk molding metal mold apparatus in accordance with the present invention.
Figure 7:
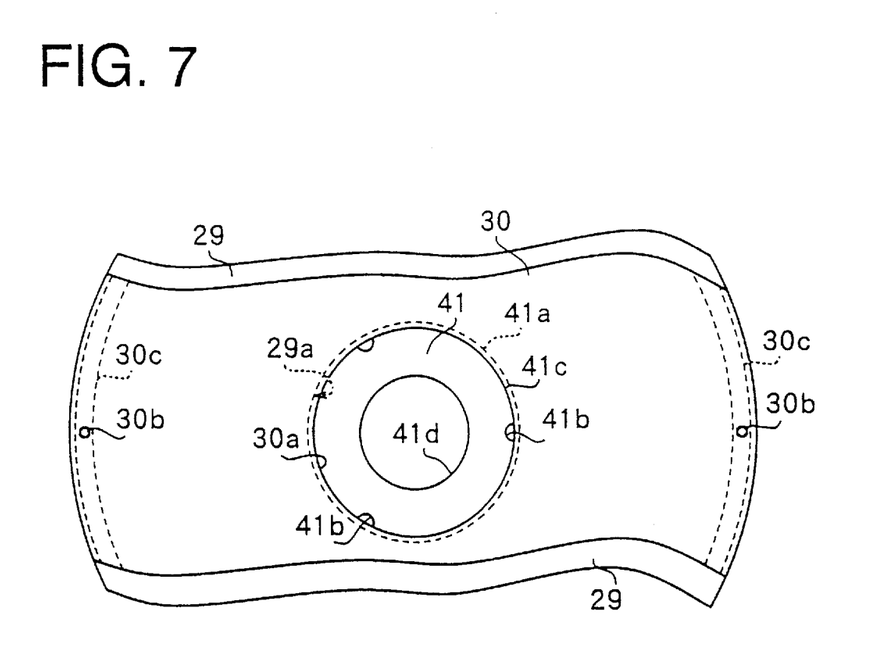
FIG. 7 is a bottom view of the embodiment of FIG. 6.

FIG. 6 is the sectional view showing a second embodiment of the disk-shaped plate, the adapter, and the stamper plate used in the optical disk molding metal mold apparatus in accordance with the present invention; and FIG. 7 is a bottom view of the embodiment of FIG. 6.

Formed at the central part of the main body of the disk-shaped plate 30 is a central hole 30a which is 1 mm smaller than the diameter of the central hole 29a of the stamper plate 29. An adapter 41 is provided with a jaw 41a which precisely fits in the central hole 29a of the stamper plate; it is also provided with a disk-shaped plate fitting part 41c of an adapter which has a smaller diameter than a stamper plate fitting part of the adapter or a jaw 41a. The disk-shaped plate fitting part 41c of the adapter 41 is equipped with three outer peripheral notches 41b. Provided at the bottom surface of the jaw 41a of the adapter 41 is a suction passage 41e for attracting the inner circumferential edge of the stamper plate 29 by suction.

The suction passage 41e is different from the one shown in FIG. 4 or FIG. 5 in that it is not located in the surface abutting the stamper plate 29; therefore, the concave deformation of the stamper plate 29 due to the pressure applied by molten resin does not take place above the passage 41e. This leads to a prolonged service life of the stamper plate 29.

Figure 8:
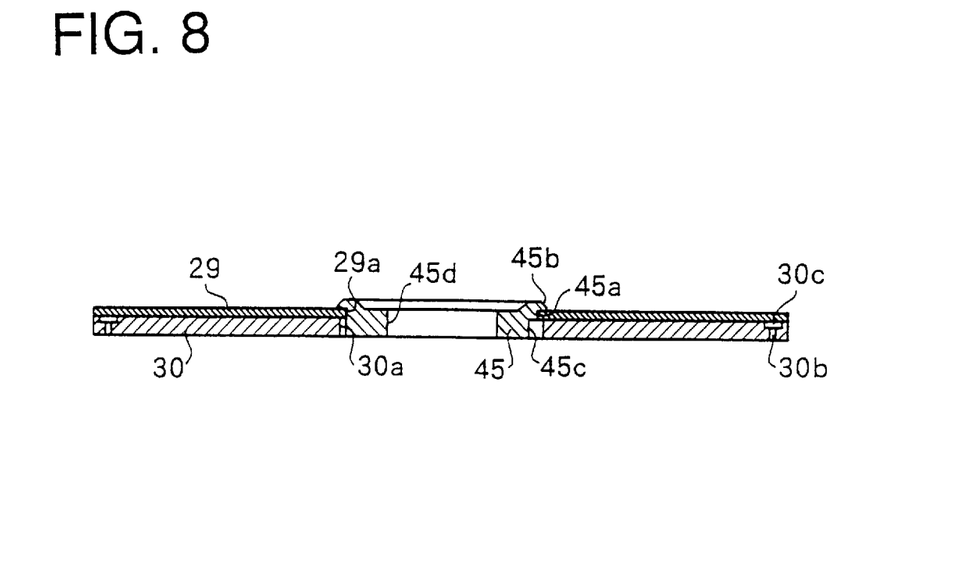
FIG. 8 is a sectional view showing an embodiment of a third combination of the disk-shaped plate, the adapter, and the stamper plate used in the optical disk molding metal mold apparatus in accordance with the present invention.
Figure 9:
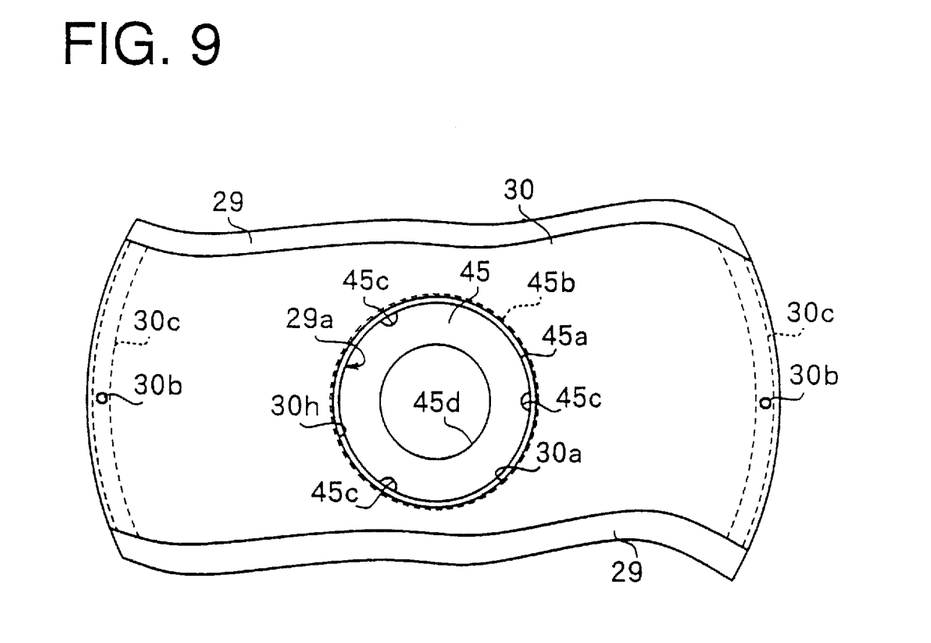
FIG. 9 is a bottom view of the embodiment of FIG. 8.

FIG. 8 is a sectional view showing a third embodiment of a the disk-shaped plate, the adapter, and the stamper plate used in the optical disk molding metal mold apparatus in accordance with the present invention; and FIG. 9 is a bottom view of the embodiment of FIG. 8.

Formed at the central part of the main body of the disk-shaped plate 30 is a central hole 30a which is 0.03 to 0.04 mm larger than the central hole 29a of the stamper plate.

An adapter 45 has a hook 45b which holds the stamper plate 29 from above onto a stamper plate fitting section 45a of the adapter. The stamper plate fitting section 45a is equipped with three outer peripheral notches 45c.

In this embodiment, the section 45a, which precisely fits in the stamper plate central hole 29a, is protected by the hook 45b from molten resin, thus preventing burrs from being produced. This feature is especially advantageous in the manufacture of an optical disk substrate in which an information signal surface or a recording surface is stuck.

Thus, the optical disk molding metal mold apparatus in accordance with the present invention has made it possible to reduce the relative slight movement due to the expansion and contraction of the stamper plate caused by the transfer of heat during the process of molding optical disk substrates. As a result, the wear on the stamper plate is reduced, permitting the service life thereof to be considerably prolonged.

Furthermore, the stamper plate can be accurately positioned by forming the central hole in the disk-shaped plate and fitting the adapter, which is provided with a section to be precisely fitted in the stamper plate central hole, in the central hole.

In addition, the adapter may be formed as a stepped cylindrical ring and a passage may be formed on the outer peripheral surface of a section held against the central hole of the disk-shaped plate, the passage being communicated with the vacuum suction circuit of the cavity plates. As another alternative, a concentric U-shaped groove may be formed on the outer peripheral section of the surface of the disk-shaped plate which contacts with the stamper plate and the U-shaped groove may be communicated with the vacuum suction circuit of the cavity plates via the suction hole which runs through the disk-shaped plate. This makes it possible to vacuumize the inner and outer peripheral edges of the surface held against the stamper plate and the surface held against the specular plate on which the disk-shaped plate is mounted so as to enable suction. The disk-shaped plate and the stepped cylindrical ring adapter may be detachably mounted on the specular plate together with the stamper plate, permitting easy replacement of the stamper plate.

Moreover, stamper plates having different central hole diameters or thicknesses may be accommodated simply by changing the dimensions of the stepped cylindrical ring adapter and the disk-shaped plate. As shown in the embodiments described above, different locking modes of the stamper plate can be achieved simply by the adapter and the disk-shaped plate. This obviates the need for changing the dimensions of the components in the metal mold as in the conventional apparatus, thus making it possible to provide a standardized metal mold with higher value added.

What is claimed is:

1. An optical disk metal mold apparatus comprising:

a fixed cavity plate;

a movable cavity plate facing the fixed cavity plate thereby forming a cavity therebetween;

a disk-shaped plate disposed on at least one of the fixed cavity plate and the movable cavity plate such that said disk-shaped plate is movable with respect to said at least one of said fixed cavity plate and said movable cavity plate;

a stamper plate concentrically supported by the disk-shaped plate such that said stamper plate is movable with respect to the disk-shaped plate and the at least one of the fixed cavity plate and the movable cavity plate;

wherein the stamper plate and the disk-shaped plate are each made of a material and further configured such that a difference between respective deformations of the disk-shaped plate and the stamper plate caused by expansion and contraction thereof due to temperature changes during a molding cycle is smaller than a difference between respective deformations of the stamper plate and the at least one of the and the movable cavity plate caused by expansion and contraction thereof due to temperature changes during a molding cycle if the stamper plate were to be in direct contact with the at least one of the fixed cavity plate and the movable cavity plate.

2. The optical disk metal mold apparatus according to claim 1, wherein, if:

$\beta_1$, $\beta_2$ and $\beta_3$ respectively denote linear expansion coefficients of the stamper plate, the disk-shaped plate and the at least one of the fixed cavity plate and the movable cavity plate;

$\Delta t_1$, $\Delta t_2$ and $\Delta t_3$ respectively denote temperature changes of the stamper plate, the disk-shaped plate and the at least one of the fixed cavity plate and the movable cavity plate during a molding cycle; and $\Delta t_1 > \Delta t_2 > \Delta t_3$;

whereby the stamper plate and the disk-shaped plate are each made of a material such that $\beta_1 \Delta t_1 > \beta_2 \Delta t_2 > \beta_3 \Delta t_3$.

3. The optical disk metal mold apparatus according to claim 1, wherein the stamper plate and the disk-shaped plate have respective linear expansion coefficients $\beta_1$ and $\beta_2$ such that $\beta_2 \geq \beta_1$ and $\beta_2 \leq 6 \times 10^{-6}$ per degree centigrade.

4. The optical disk metal mold apparatus according to claim 1, wherein the stamper plate defines a central hole therein, the apparatus further comprising an adapter for concentrically supporting the stamper plate and the disk-shaped plate on the at least one of the fixed cavity plate and the movable cavity plate, the adapter further having an outer peripheral section which fits in at least the central hole of the stamper plate.

5. The optical disk metal mold apparatus according to claim 4, wherein:

the central hole in the stamper plate is a first central hole;

the disk-shaped plate defines a second central hole therein; and the adapter comprises a stepped cylinder having:

a first outer peripheral section which fits into the first central hole; and a second outer peripheral section which fits into the second central hole.

6. The optical disk metal mold apparatus according to claim 4, wherein the adapter has:

an outer peripheral section which fits in at least the central hole in the stamper plate; and a jaw having a larger diameter than the central hole in the stamper plate for holding a circumferential edge of the central hole.

7. The optical disk metal mold apparatus according to claim 4, wherein:

the at least one of the fixed cavity plate and the movable cavity plate defines as suction passage therein; and the adapter defines a passage therein communicating with the suction passage for attracting the stamper plate by suction.

8. The optical disk metal mold apparatus according to claim 4, wherein:

the at least one fixed cavity plate and the movable cavity plate defines as suction passage therein; and the disk-shaped plate defines a passage near an outer periphery thereof which communicates with the suction passage for attracting an inside region of an outer peripheral section of the stamper plate by suction.

* * * * *